3,038,794
PLANT GROWTH REGULATOR
Robert J. Geary, Vero Beach, Fla., and Richard Haber, Great Neck, N.Y., assignors to Plant Products Corporation, Blue Point, N.Y., a corporation of New York
No Drawing. Filed Nov. 4, 1958, Ser. No. 771,743
10 Claims. (Cl. 71—2.5)

This invention relates to the production of plant growth regulators, and more particularly to novel gibberellin derivatives, methods for their production, and compositions containing same for use in the regulation of the growth rate of plants.

The gibberellins constitute a group of plant growth regulators which have been recently and are still the subject of a great deal of investigation. The gibberellins are produced by a fungus, *Gibberella fujikuroi*, which causes a disease of rice known as "Backanae" first reported in Japan in 1898 and since observed in a number of other countries in the Orient, Italy, and Africa. The Japanese call this condition "the foolish seedling" because the plants grow unusually tall, and then die. In a paper by Frank H. Stodola entitled "The Isolation, Characterization and Chemical Properties of the Gibberellins," presented August 28, 1956, at the symposium on "Natural Plant Growth Regulators Other Than Auxin," American Society of Plant Physiologists, American Institute of Biological Sciences, Storrs, Connecticut, there is described the work of the author and other scientists in the field in isolating the gibberellins from cultures of the fungus, and in ascertaining the properties and the structures of the various growth promoting or regulating types of gibberellin obtained therefrom. The gibberellins are white, crystalline, optically active materials having the following empirical formulae:

Gibberellin $A_1$ (gibberellin A), $C_{19}H_{24}O_6$, $(\alpha)_D$ $+36°$
Gibberellin $A_2$, $C_{19}H_{26}O_6$, $(\alpha)_D$ $+11.7°$
Gibberellin $A_3$ (gibberellin X) (gibberellic acid), $C_{19}H_{22}O_6$, $(\alpha)_D$ $+91°$
Gibberellin $A_4$, $C_{18}H_{22}O_5$ While all of these gibberellins are more or less highly active growth promoting or regulating substances, gibberellins $A_1$ and $A_3$ are of major importance and they and mixtures of them are being presently produced for the market. Gibberellin $A_3$ otherwise known as gibberellin X or gibberellic acid, is understood to have the following structural formula:

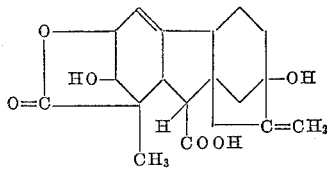

The gibberellin $A_1$ differs from the gibberellin $A_3$ in containing only one double bond (and two more hydrogen atoms). The gibberellins are soluble in all lower alcohols and their monobasic sodium, ammonium and potassium salts are soluble in water. Otherwise they are relatively insoluble in water. As indicated above, they are presumed to contain a carboxyl group in free form or in the form of the salt or methyl ester.

While these gibberellins are highly effective as growth regulating substances, they have been found to be subject to certain disadvantages in actual use. The growing plant tissues, such as the fully developed leaves, as differentiated from the newly opened leaves or buds or stems, do not absorb and translocate the gibberellins in true systemic manner. To be more specific, if the gibberellin is applied either as an aqueous or alcohol spray, or as a lanolin paste to the stem, bud, or newly expanded leaf of a broad leaf plant (dicotyledon) as differentiated from a grass (monocotyledon), the typical cell elongation effect is noted in stimulated growth and lighter green color of the plant. However, if the gibberellin is so applied to the older leaves, for instance only the third leaf down from the bud of a broad leaf plant, no visible reaction takes place. This has been found to be due to lack of absorption into the leaf of the acid or salt or other form of the naturally occurring gibberellin. If the gibberellin is instead injected into the leaf, the entire stem above the leaf, and subsequent buds, show the typical cell elongating effect.

It is an object of this invention to provide a gibberellin derivative which while having the desired growth regulating properties, will not be subject to the above disadvantages. Another object of this invention is the provision of a gibberellin derivative which will have improved growth regulating properties. Still another object of this invention is the provision of a gibberellin derivative having improved plant growth regulating properties and which, in addition, has improved and increased ability to penetrate into and be absorbed by, and translocated within, the plant structure. Other objects and advantages will appear as the description proceeds.

The attainment of the above object is made possible by the present invention, which comprises a gibberellin ester having the formula G—CO—O—$R^1$—$(OR^2)_n$—OR wherein G—CO—O— represents the residue of a carboxyl-containing gibberellin, $R^1$ and $R^2$ are alkylene groups of about 1 to 3 carbon atoms, R is an alkyl group of about 2 to 12 carbon atoms, and $n$ has a value of 0 to 3.

The gibberellin esters of this invention have been found to have improved leaf and plant penetration properties, as established by true systematic effect on subsequent plant growth. Such esters apparently have the proper lipoid solubility for effective leaf and other plant structure penetration, plus a sufficient water solubility for translocation in the plant, or they may possibly break down in the plant structure to the acid form to give sufficient water solubility possibility as metal salts formed by the plant supply of such metals to give true systemic effect.

In the above formula for the gibberellin esters of the present invention, $R^1$ and $R^2$ may be the same or different and may be methylene, ethylene, propylene or isopropylene, and R may be ethyl, or normal or isomeric propyl, butyl, hexyl, octyl, or dodecyl or the like. Preferably, $R^1$ is ethylene, R is an alkyl group of 3 to 5 carbon atoms, more preferably butyl, and $n$ has a value of 0, the preferred specific embodiment being the ester of the carboxyl-containing gibberellin with the monobutyl ether of ethylene glycol (beta-butoxyethanol), i.e. the butoxyethyl ester. The preferred esters are those derived from gibberellic acid (gibberellin $A_3$), but esters of gibberellin $A_1$ or any of the other carboxyl-containing gibberellins, or mixtures of any of these gibberellins may also be employed. Where the carboxyl-containing gibberellins is obtained in the form of its methyl ester, for example, mild direct or indirect hydrolyzing conditions may be employed to produce the free acid, or the methyl ester may be transesterified in a careful manner to substitute the desired alkoxyalkylene group for the methyl group.

In view of the known sensitivity of the gibberellins, care must be taken in carrying out the desired esterification reaction to prevent deterioration of the basic gibberellin structure. According to one embodiment of this invention, the desired gibberellin ester of the above formula may be prepared by reacting the carboxyl-containing gibberellin with a lower alkyl chlorocarbonate under anhydrous conditions, and then reacting the resulting lower alkyl carbonic ester of the carboxyl-containing gibberellin with an alkoxy alcohol of the formula HO—$R^1$—$(OR^2)_n$—OR wherein $R^1$, $R^2$, R and $n$ have the values given above. In the first step of this reaction, one mole of the gibberellic acid or other carboxyl-containing gibberellin is reacted with one mole of the lower alkyl chlorocarbonate, preferably at low temperatures, for example less than about 10° C., under anhydrous conditions. As the lower alkyl chlorocarbonate, there may be mentioned methyl, ethyl, propyl, butyl, isoamyl, isobutyl, and preferably ethyl chlorocarbonate. This reaction should also be carried out in the presence of an equimolar amount of an acid acceptor to bind the acid liberated. As such acid-acceptor there is preferably employed any water soluble liquid low molecular weight tertiary amine, for example the lower alkylamines such as triethylamine, tripropylamine and tributylamine, in addition to pyridine and the like. This reaction is also preferably carried out in the presence of an organic solvent for the reactants, in order to facilitate reaction and maintain anhydrous conditions. As such a solvent, there may be mentioned any low boiling liquid solvent inert to both the gibberellin and the lower alkyl chlorocarbonate employed in this first step of the reaction. Examples of such solvents include ethyl acetate, isopropyl acetate, n-propyl acetate, and the like. In general, from about 10 to 50 parts by volume of the solvent per part by weight of the carboxyl-containing gibberellin may be employed, although other proportions may be also made use of. In this first step of the reaction, there is produced the lower alkyl carbonic ester of the gibberellin employed.

In the second step of this embodiment of the process, the resulting carbonic ester from the first step is reacted with an equipmolar amount of an alkoxy alcohol of the formula given above, whereby a trans-esterification takes place, the desired ester of the carboxyl-containing gibberellin with the alkoxy alcohol being formed with liberation of carbon dioxide and a lower alkyl alcohol. Preferably, this second step is also carried out in organic solvent solution, as by adding the alkoxy alcohol to the reaction mixture resulting from the first step. A further amount of organic base may be added to assure alkalinity. The desired gibberellin ester is then separated from the reaction medium in known manner, for example by washing with dilute acid to remove any organic base residue, then with a weak alkali to remove traces of acid, then water to remove inorganic salts, after which the organic solvent employed as the reaction diluent may be evaporated or otherwise removed to obtain the desired ester as a crystalline material.

As examples of alkoxy alcohols which may be employed in the above described embodiment of the process for producing the desired gibberellin esters there may be mentioned the monoethyl, monobutyl, monooctyl, and monodecyl ethers of ethylene glycol, propylene glycol, diethylene glycol, triethylene glycol, tetraethylene glycol, dipropylene glycol, tripropylene glycol, and tetrapropylene glycol and the like.

Alternatively, the desired gibberellin ester may also be prepared by reacting the carboxyl-containing gibberellin, in the form of its alkali metal salt, with compounds corresponding to the alkoxy alcohols listed in the foregoing paragraph except that the terminal hydroxy group is replaced by a chlorine atom. Such compounds have the formula Cl—$R^1$—$(OR^2)_n$—OR. For example, in this process, instead of the use of the monobutyl ether of ethylene glycol in the above reaction for producing the preferred ester of this invention, there is employed for direct reaction with the alkali metal salt of the carboxyl-containing gibberellin, the monobutyl ether of beta-chlorethanol.

It will be understood that in either of the above described process embodiments, an amount of one reactant in excess of theoretical may be employed to hasten equilibrium, etc.

The following example of a preferred method of making the gibberellin esters of the instant invention is understood to be only illustrative and not limitative.

*Example*

13 gms. K salt of gibberellic acid are dissolved in 50 cc. water and 20 cc. 2 N HCl added. Gibberellic acid precipitates. The free acid is taken up in ethyl acetate, washed with water to free from any inorganics and dried over anhydrous sodium sulfate. The following day the solution is filtered from the sodium sulfate and cooled to 10 deg. C. at which time 3.03 gms. triethylamine are added with stirring. 3.15 cc. ethyl chlorocarbonate are then added with stirring while keeping the mixture at 10 deg. C. or lower for a period of thirty minutes. At the end of this period 7.85 cc. monobutyl ether of ethylene glycol and 4.15 cc. triethylamine are added. The mixture is stirred for about three minutes to insure homogeneity and left overnight in the refrigerator.

The following day the solution is washed with dilute HCl to remove any organic base residue, then with sodium bicarbonate to remove traces of acid, then water to remove inorganic salts.

The ethylacetate is then evaporated to a point where an oil remains. This oil is extracted with an equal mixture of ethyl acetate-petroleum ether and chilled whence a crystalline precipitate (the butoxyethyl ester of gibberellic acid) settles out in a yield of approximately 4.5 gms.

The product melts with decomposition at 207–210° C. and gives a typical red-blue fluorescence with concentrated sulfuric acid. It is insoluble in water but soluble in most organic solvents such as alcohol, ethyl acetate, etc.

It will be understood that the process of the above example can be employed for producing other gibberellin esters by, for example, employing instead of gibberellic acid any of the other gibberellins, particularly gibberellin $A_1$ and mixtures of gibberellic acid and gibberellin $A_1$. As stated hereinbefore, the only requirement is that the gibberellin contain a carboxyl group in free, salt or displaceable lower alkyl ester form. Similarly, any of the above mentioned glycol or polyglycol monoalkyl ethers (alkoxy alcohols) may be employed to produce the corresponding gibberellin ester instead of butoxyethyl ester produced in the above example.

The gibberellin esters of the present invention have all of the growth regulating properties which are already known as possessed by the free acid and their salts and lower alkyl esters. However, because of the particular structure of the present esters and their improved lipoid solubility, they are under many conditions surprisingly more effective and potent than the hitherto available gibberellins. For this reason they often have an improved growth promoting effect on the plant or may be used in a lesser amount to achieve the same effect, and in many instances are operative where the former gibberellins are inoperative.

The gibberellin esters of the present invention may be employed for application to the plant in any desired manner for achieving the desired growth regulating effect. Because of the great potency of the gibberellin esters, they must be applied in highly diluted form to the plant, and may be applied in the form of a liquid, paste, or solid. Such dilutions may be higher, lower or the same as those employed with the existing gibberellins, depending on the diluent, plant, etc. Optimum dilutions are in any particular instance readily determined by routine experimentation. Such growth regulating compositions may be prepared by formulating the gibberellin ester with a carrier or inert diluent which may be a solid, as for dust application, or a liquid, for example as a suspension or solution in water, as an oil-in-water type emulsion or as a solution in an organic solvent, or it may be formulated with a fatty or viscous material such as lanolin or methyl cellulose for application as a paste to the plant. Desirably, such compositions may also contain a surface active agent which may be a dispersing agent or a wetting agent or a combination thereof.

In the formulation of dusts, powders and other particulate compositions, the gibberellin ester in finely divided crystalline form may be admixed with a free flowing finely divided dry inert carrier which may be organic or inorganic. Examples of such solid carriers include sawdust, the flours derived from soyabean, peach-pit, apricot-pit, lignocellulose, and the like. As inorganic carriers, there may be mentioned the silicas such as diatomite, pumicite, and tripolite, in addition to the carbonates such as calcite and dolomite, silicates such as mica, talc, pyrophyllite and the various clays such as montmorillonite, saponite, kaolinite, attapulgite, and the like.

Powdered compositions may also be prepared by first preparing a concentrate of the gibberellin ester in an organic solvent, for example, an 0.1 to 1% solution of the gibberellin ester in alcohol, acetone, ethyl acetate or the like, and such concentrate then employed for impregnating any of the above mentioned solid carriers. Such particulate compositions, containing the present gibberellin esters in use concentrations of about 1 to 1000 p.p.m., are effective and useful, for example, for dipping plant roots, cuttings and other surfaces, for treating the soil around the plant, or for dusting the plant part together, if desired, with fertilizers, insecticides, fungicides, and/or other growth regulating substances. As a specific example, 1 part of the above butoxyethyl ester is ground in 1,000 parts of attapulgite.

Liquid formulations may be prepared by dissolving the present gibberellin esters in water in dilutions of from 1 to 1,000 p.p.m. or more, desirably with the aid of organic solvents and/or surface active agents. For example, the gibberellin ester may be dissolved in sufficient surface active agent, desirably of the non-ionic type, to produce a final concentration of about 0.1% of the surface active agent and this concentrate then added to the required quantity of water to produce emulsions, suspensions or solutions containing from 1 to 1,000 p.p.m. or more of the gibberellin ester. Alternatively an organic solvent, preferably water miscible such as ethyl alcohol, acetone or the like, is employed for first producing a concentrated solution of the gibberellin ester in the organic solvent with the aid of a surface active agent after which the concentrate is diluted with water to the desired dilution. For example, one gram of the above gibberellin ester is dissolved in 4 or 5 ml. of 95% of ethyl alcohol. To this alcoholic solution there is added 1 ml. of non-ionic surface active agent (e.g. polyethylene glycol ether of sorbitan monolaurate). This mixture of gibberellin ester, surface active agent and alcohol is then slowly mixed into one liter of water. To prepare any desired range of usage levels, this final stock solution or concentrate is diluted 1 to 20 or more times with a second stock solution made by dissolving 40 to 50 drops of the surface active agent in one liter of water. The resulting aqueous solutions or dispersions may be employed for spraying the plant, dipping the plant parts, or placing in the form of droplets upon the tips, buds, leaves and other parts of the plant.

In the formulation of pastes, a 1% paste may for example be prepared by mixing about 12.5 mg. of the above gibberellin ester with about 7 drops (about 250 mg.) of nonionic surface active agent (e.g. same as above) and warming until the ester has dissolved. The resulting solution is then mixed into one gram of melted lanolin to produce a creamy paste which may be applied in 20 mg. portions as a band around the basal portion of partially elongated stems of some plants or as a thin layer over the surface of vegetative buds or roots, tubers, and the like, or over cut or peeled surfaces.

It will be understood that the term "plant" is herein intended to include plant seeds also, since the treatment of seeds with the gibberellin esters in many instances have produced improved and unexpected growth regulating, germinating and other results. The seeds may be sprayed, dipped, dusted, brushed or otherwise treated with formulations containing the present gibberellin esters in order to achieve the desired germinating and growth promoting and other results.

It will also be understood that the present gibberellin esters may be applied, in any of the above described forms and in any other forms obvious to workers skilled in the art, in combination with other plant hormones or growth regulating substances in the known dilutions, e.g. 10 to 20 p.p.m., such as indolylbutyric acid, indolylacetic acid, naphthalene acetic acid, 2,4-dichloro- and 2,4,5-trichlorophenoxy acetic or propionic acid, or the like, or mixtures thereof alone or in combination with known fungicides, insecticides, and the like.

Dusts and powders of the above described type containing the present gibberellins, and also containing appreciable amounts of surface active agents, e.g. 0.5–50% may be employed as wettable powders for sale or immediate use for the production of aqueous slurries for application to the plant by simply admixing the required amount of water in the field to produce the desired use concentrations. In the production of oil-in-water emulsions, a concentrate of the gibberellin ester in a water insoluble organic solvent such as xylene or the like may be prepared and made available for sale or immediate use, such concentrate further preferably containing an emulsifying agent of known type. Such concentrates may then readily be emulsified in the required amount of water for application to the plant. If desired, organic solvent formulations, such as solutions in alcohol, may be prepared for application in the form of an aerosol in which the active gibberellin ester is dispersed in a liquid capable of expanding rapidly to atomize the composition. Such a composition may contain, for example, about 1 to 1000 p.p.m. of the gibberellin ester, up to 10% of alcohol, acetone or cyclohexanone acting as a coupling agent or mutual solvent, up to 10% of an oil such as mineral oil or vegetable oil serving to regulate particle size, if desired, and the remainder a solvent capable of expanding rapidly at ordinary temperatures to form a gas, as, for example, one of the Freons, e.g. dichlori-di-fluoromethane, or methyl chloride.

The surface active wetting, dispersing and emulsifying agents employed in formulating the above described growth regulating compositions containing the present gibberellin esters may be anionic or cationic, but are, as indicated, preferably of the well known nonionic type as represented by the reaction products of polyalkylene glycols with organic compounds containing at least 8 carbon atoms and a reactive hydrogen atom. Such agents are generally produced in well known manner by reaction of from about 2 to 100 or more moles of butylene oxide, propylene oxide, but preferably ethylene oxide, with one mole of a higher molecular weight phenol naphthol, alcohol, mercaptan, carboxylic acid, amine, amide or the like. Illustrative examples include the reaction products of 10 moles of ethylene oxide with 1 mole each of nonyl phenol, dinonyl phenol, octyl naphthol, lauryl alcohol, sorbitanmonolaurate, dodecyl mercaptan, oleic acid, stearyl amine, lauroylamide, and the like.

It will be understood that other usual assistants may be included in the plant treating formulations such as bonding agents, spreading agents, sticking agents, extenders, solvents, and the like. It will also be understood that the concentration of the particular gibberellin ester in the composition being applied, the form of composition, the amount thereof, the manner and frequency of application, and the like will depend upon the kind, condition, type, size and age of plant, etc. All of these variables are interrelated and their best combinations for attaining the desired results readily ascertained by preliminary testing in the well known manner. In some instances, amounts as small as about 0.001 mcg. of the gibberellin esters of the present invention per plant have been found to produce significantly increased rates of growth.

Among the effects produced by the gibberellin esters of the present invention are accelerated cell growth, both in length and diameter. This has a pronounced effect in thickness of stems and their length also. In the case of the meristems, the twigs that hold the fruit on the plant, the present esters causes oranges, tangerines, grapefruit, and other citrus plants to retain their fruits so that a larger crop is obtained which crop can also be retained on the trees for a longer period of time thus contributing to increased size of the fruits. The effect of hastening the germination of seeds, particularly cotton seed and corn seed, is very important as it removes or reduces the dangers inherent in slow germination, i.e. rat and insect damage.

This invention has been disclosed with respect to certain preferred embodiments, and various modifications and variations thereof will become obvious to the person skilled in the art. It is to be understood that such modifications and variations are to be included within the spirit and scope of the instant invention.

What is claimed is:

1. A gibberellin ester having the formula $$G-CO-OR^1-(OR^2)_n-OR$$

wherein G—CO—O— represents the residue of a carboxyl-containing gibberellin selected from the group consisting of gibberellin $A_1$, $A_2$, $A_3$, and $A_4$, $R^1$ and $R^2$ are alkylene of 1 to 3 carbon atoms, R is alkyl of 2 to 12 carbon atoms, and $n$ has a value of 0 to 3.

2. The butoxyethyl ester of gibberellic acid.

3. A process for producing a gibberellin ester of the formula defined in claim 1 comprising reacting a carboxyl-containing gibberellin selected from the group consisting of gibberellin $A_1$, $A_2$, $A_3$, and $A_4$ with a lower alkyl chlorocarbonate under anhydrous conditions, and then reacting the resulting lower alkyl carbonic ester of the carboxyl-containing gibberellin with a compound of the formula $HO-R^1-(OR^2)_n-OR$ wherein $R^1$ and $R^2$ are alkylene of 1 to 3 carbon atoms, R is alkyl of 2 to 12 carbon atoms, and $n$ has a value of 0 to 3.

4. A process for producing the butoxyethyl ester of gibberellic acid comprising reacting gibberellic acid with ethyl chlorocarbonate under anhydrous conditions, and then reacting the resulting ethyl carbonic ester of gibberellic acid with the monobutyl ether of ethylene glycol.

5. A method of promoting the growth rate of a plant comprising applying thereto an effective amount of gibberellin ester as defined in claim 1.

6. A method of promoting the growth rate of a plant comprising applying thereto an effective amount of the butoxyethyl ester of gibberellic acid.

7. A gibberellin ester as defined in claim 1 wherein said carboxyl-containing gibberellin is gibberellic acid.

8. A plant growth promoting composition in dry particulate form consisting essentially of a free flowing finely divided dry inert carrier and 1 to 1,000 parts per million of a gibberellin ester as defined in claim 1.

9. A plant growth promoting composition consisting essentially of 1 to 1,000 parts per million of a gibberellin ester as defined in claim 1 dispersed in an aqueous liquid medium.

10. A plant growth promoting composition in the form of an aerosol consisting essentially of 1 to 1,000 parts per million of a gibberellin ester as defined in claim 1, up to 10% of a mutual solvent selected from the group consisting of alcohol, acetone and cyclohexane, up to 10% of a member of the group consisting of mineral and vegetable oils, dispersed in a liquid capable of expanding rapidly at ambient temperatures to form a gas.

References Cited in the file of this patent

UNITED STATES PATENTS 1,970,578     Schoeller et al.           Aug. 21, 1936

OTHER REFERENCES

Brian et al.: J. Sci. Food, Agr., vol. 5, pages 602–612 (1954).

Merck and Co., "Gibrel," Rahway, New Jersey (May 1958), pages 14, 15.